United States Patent Office.

JOHN B. WATKINS, OF ST. LOUIS, MISSOURI, ASSIGNOR OF ONE-HALF TO ESSMUELLER MILL FURNISHING COMPANY, A CORPORATION OF MISSOURI.

PROCESS OF CONDITIONING AND TEMPERING CORN FOR DEGERMINATION AND MILLING.

943,722. Specification of Letters Patent. Patented Dec. 21, 1909.

No Drawing. Application filed December 31, 1908. Serial No. 470,238.

*To all whom it may concern:*

Be it known that I, JOHN B. WATKINS, a citizen of the United States, and resident of St. Louis, Missouri, have invented certain new and useful Improvements in Processes of Conditioning and Tempering Corn for Degermination and Milling, of which the following is a specification.

My invention consists of a process of conditioning and tempering corn for degermination and milling, and has for its object to provide a method whereby grains of corn may be conditioned and tempered, so that the hull may be loosened from the body of the grain; the grain being thereafter treated by the removal of the hull and the removal of the germ, the resultant product thereupon being dried and milled for the production of grits, meal, or other desired pulverized or granular corn products.

The methods of my invention may be practiced by the employment of any of the considerable variety of well known mechanical devices now used in the art of milling.

The grains or kernels of corn having been removed from the ear are introduced to a bath of steam, preferably live steam, to the extent of heating and measurably saturating the hull, but not to the extent of permitting the saturation to extend inwardly beyond the hull into the body of the grain or kernel. The next step of my process is performed almost instantaneously upon the completion of the steam bath, and consists in subjecting the grain or kernel to a bath of cold water at the normal temperature of running water supplied from any ordinary source of water supply or water storage; as, from city water mains, from wells or storage tanks. At this stage of the process the hull has become loosened from the grain or kernel but not removed therefrom. The hull is then removed by suitable frictional appliances such as a huller, a scourer or rolls; the previous loosening of the hull by the earlier steps of my process enabling the removal of the hull to be accomplished by a minimum of power, or a power considerably less than that required to hull grains or kernels not so treated. The hull being removed, the grain or kernel is next degerminated by any of the appliances well known in the art and the grain or kernel thus degerminated being in a warm and more or less moistened condition, it is next dried to expel its moisture and to render the grain or kernel measurably dry and conditioned for milling. The grain or kernel thus dried and conditioned is then milled to a degree of fineness regulated by the character of the finished product desired.

The advantages of my invention reside in the economy of the power required to effect the removal of the hull and germ from the grain or kernel and in the increased saving of the more valuable granular corn products as compared with the inferior products.

Other advantages incident to the practice of my invention are as follows. It is adapted to mills of small capacity inasmuch as the degermination of the grain may be effected by light and simple apparatus of a capacity as small as two bushels per hour with economy; while in the degermination of corn not treated by the early steps of my process, degerminating machinery cannot ordinarily be secured of a capacity of less than twenty-five bushels per hour, with which minimum capacity milling cannot be accomplished economically. Again, by the employment of my process, the first run of meal is of perfect whiteness, the hull and germ having theretofore been removed and without crushing or other molecular disturbance of the body of the grain or kernel, the whiteness of the product being enhanced by the steam and water treatment employed in my process; whereas, when hulling and degermination are, as in the prior art, accomplished when the grain or kernel is in its dry and untreated condition, the first run of meal is yellow, from the admixture of the germ and hull, and the subsequent operations of milling are impeded from the crushing or molecular disturbance effected in the body of the grain or kernel.

By "steam" is meant true steam as the term is understood by engineers, and not mere heated vapor.

Having fully described my invention, what I claim as new and desire to have secured to me by the grant of Letters Patent, is:

1. The process of conditioning and tempering corn for degermination and milling comprising the following steps: subjecting the grains or kernels of corn to a bath of steam; almost instantaneously thereafter subjecting the grains or kernels to a bath of cold water; removing the hulls by frictional means; degerminating the grains or kernels when hulled; drying the grains or kernels thus degerminated; and milling the product when dried, substantially as described.

2. The process of conditioning and tempering corn for degermination and milling comprising the following steps: subjecting the grains or kernels of corn to a bath of live steam; almost instantaneously thereafter subjecting the grains or kernels to a bath of cold water; removing the hulls by frictional means; degerminating the grains or kernels when hulled; drying the grains or kernels thus degerminated; and milling the product when dried, substantially as described.

In testimony whereof, I have signed my name to this specification, in presence of two subscribing witnesses.

JOHN B. WATKINS.

Witnesses:
JAMES L. HOPKINS,
WALTER C. STEIN.